United States Patent [19]

Harja

[11] 4,337,909
[45] Jul. 6, 1982

[54] MAGNETIC TAPE CASSETTE
[75] Inventor: Arne M. Harja, Bellevue, Wash.
[73] Assignee: Sundstrand Corporation, Rockford, Ill.
[21] Appl. No.: 200,286
[22] Filed: Oct. 24, 1980
[51] Int. Cl.³ .......................... G03B 1/04; G11B 15/32
[52] U.S. Cl. ..................................... 242/199; 360/132
[58] Field of Search ............................... 242/197–200; 360/96, 132, 93, 99

[56] References Cited
U.S. PATENT DOCUMENTS

| | | | |
|---|---|---|---|
| 3,800,322 | 3/1974 | Schoettle et al. | 360/96 |
| 3,870,248 | 3/1975 | Nara et al. | 242/198 |
| 4,093,149 | 6/1978 | Shroff et al. | 242/198 |
| 4,093,151 | 6/1978 | Karsh | 242/198 |

Primary Examiner—Leonard D. Christian
Attorney, Agent, or Firm—Ted E. Killingsworth; Michael B. McMurry; Harold A. Williamson

[57] ABSTRACT

A tape cassette particularly adapted for use with a dual capstan magnetic tape deck that does not utilize pinch rollers, includes a pair of capstan actuators that respond to a central loading knob which serves to move the tape away from the capstans when the cassette is loaded or unloaded into the tape deck. In addition, the cassette includes a pair of tape guide actuators that respond to the loading knob by rotating and forcing the tape away from the magnetic head and tape guide pins of the tape deck during the loading or unloading operation. This single knob controls both the capstan actuators and the tape guide actuators. The capstans and reels are arranged such that a large angle of wrap, 165° or more, around the capstans is provided in order to effectively drive the tape without the need for pinch rollers. An additional feature is the provision of a flange on one of the capstan actuators which rotates into a position when the cassette is in the play mode of operation that is effective to prevent a pin secured to the base of the tape deck from entering a cassette thereby serving as an interlock preventing loading of the cassette into the deck when the cassette is in a play mode.

26 Claims, 8 Drawing Figures

MAGNETIC TAPE CASSETTE

TECHNICAL FIELD

The invention relates to the field of magnetic tape recording equipment and, in particular, to a dual capstan magnetic tape cassette for use with a dual capstan tape deck.

BACKGROUND OF THE INVENTION

In many prior art magnetic tape cassettes, pinch rollers are used to drive the magnetic tape by lifting tape out of removable cassettes into contact with the drive capstans when the cassette is loaded into a tape deck. However, pinch rollers tend to cause tape handling problems such as skew as well as adding cost and complexity to the tape transport system.

In certain applications such as audio reproducers used in aircraft entertainment systems, it is considered important to provide highly reliable operation in environments of extreme temperature and vibration as well as to minimize costs. Another important factor is to provide an audio system wherein the tape can be changed quickly by unskilled personnel under very limited time constraints as is frequently the case with airline operations.

SUMMARY OF THE INVENTION

It is therefore an object of the invention to provide a magnetic tape cassette having tape reels for use with a dual capstan tape deck having a magnetic head wherein a pair of tape drive capstan actuators are provided to permit the tape from the tape reels to be moved away from the capstans along with a pair of rotatable guide actuators effective to move the tape away from the magnetic head while the cassette is being loaded in the deck.

It is another object of the invention to provide a magnetic tape cassette having a pair of tape reels contained within a housing for use with a dual capstan tape deck wherein the tape cassette housing includes an opening configured to receive the magnetic head of the tape deck when the cassette is loaded in the tape deck along with a pair of capstan actuators that serve to engage the tape deck capstans with the tape when the cassette is in a play mode in the deck and disengages the tape from the capstans when the cassette is being loaded into the deck and a pair of rotatable guide actuators which are effective to move the tape away from the magnetic head during the loading operation.

It is a further object of the invention to provide a magnetic tape cassette having a pair of tape reels for use with a dual capstan tape deck with the cassette having a housing configured with an aperture on one side suitable to receive the magnetic head of the tape deck when the cassette is loaded in the tape deck, a pair of rotatable capstan actuators connected to a manually actuable knob by means of a control wire and a pair of rotatable tape guide actuators similarly connected to the knob by a control wire. The tape guide actuators are effective to move the tape away from the magnetic head and tape guide pair during a load operation and the capstan actuators are effective to disengage the tape from the tape deck capstans when the cassette is in the load position in the tape deck. In addition the reels are located within the cassette housing such that the tape wrap angle is 165° or more.

DETAILED DESCRIPTION OF THE INVENTION

Figure 1:
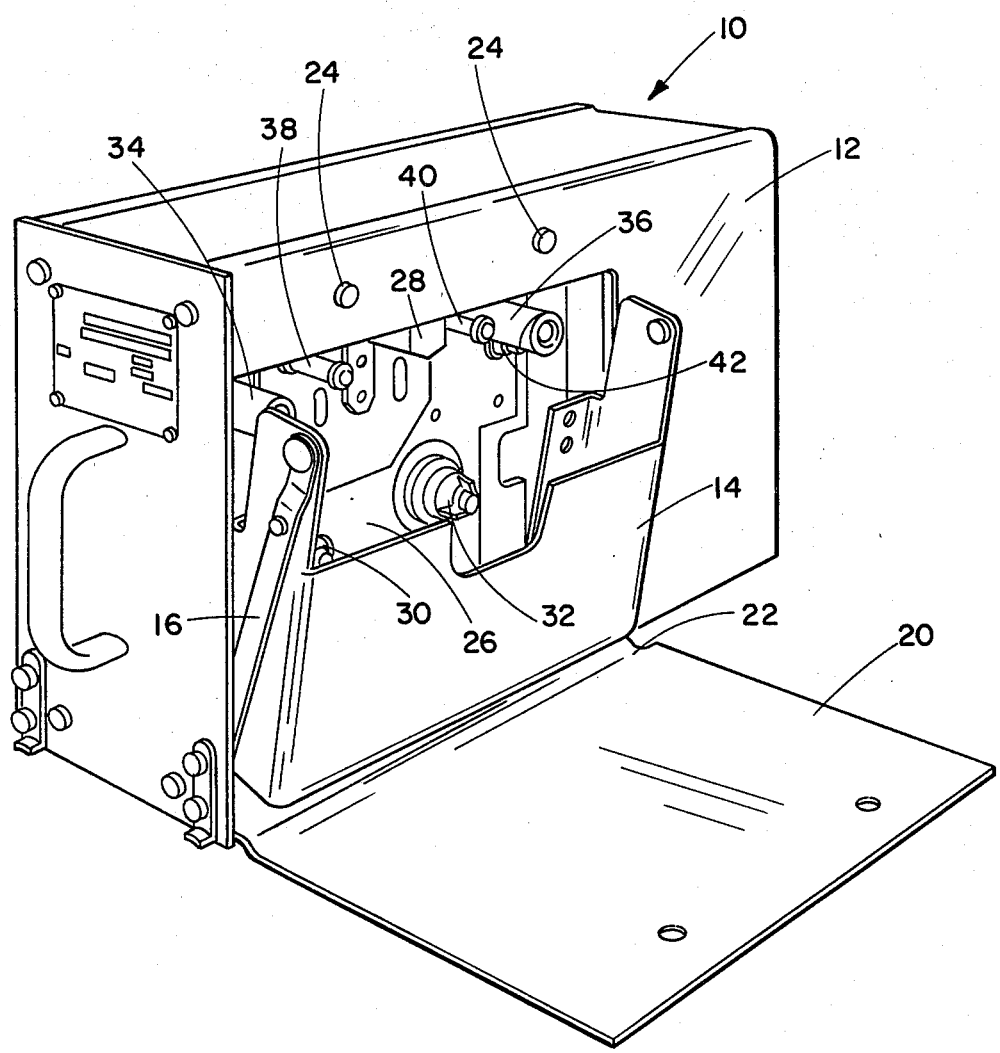
FIG. 1 is a perspective view of a dual capstan tape deck for use with a magnetic tape cassette.

In FIG. 1 of the drawings is illustrated an audio reproducer or tape deck 10 which is suitable for use in aircraft audio entertainment systems. The tape deck 10 includes a housing 12 which encloses the mechanical and drive portion of the tape deck as well as the audio electronics. Included in the tape deck housing is a drawer 14 supported by a hinge element mechanism 16 that allows the top portion of the drawer 16 to pivot outwardly from the housing 12 to receive a tape cassette 18 of the type illustrated in FIG. 2. When the cassette is inserted into the drawer 14, the hinge mechanism 16 permits the cassette 18 to be placed in engagement with the tape deck and a door 20 is adapted to be placed over the drawer and the cassette thereby protecting the tape deck and cassette from the environment. In this embodiment hinges 22 on the door 20 permit the door to be rotated upwardly and secured by fastening members 24 to the housing 12 of the tape deck 10.

As shown in FIG. 1, the tape deck includes a base plate 26, a magnetic recording head 28 and a pair of reel drives 30 and 32 driven by motors (not shown). In addition, the tape deck 10 includes a pair of capstans 34 and 36 which are driven by motors (not shown) such that the magnetic tape is drawn across the magnetic head at a constant predetermined speed. Also secured to the base plate 26 of the tape deck 10 are a pair of tape guide pins 38 and 40 that are located so as to ensure that the magnetic tape is drawn across the magnetic recording head 28. The base plate 26 further includes and interlock pin 42 for preventing an insertion of the cassette 18 into the deck 10 in the wrong operating mode.

Figure 2:
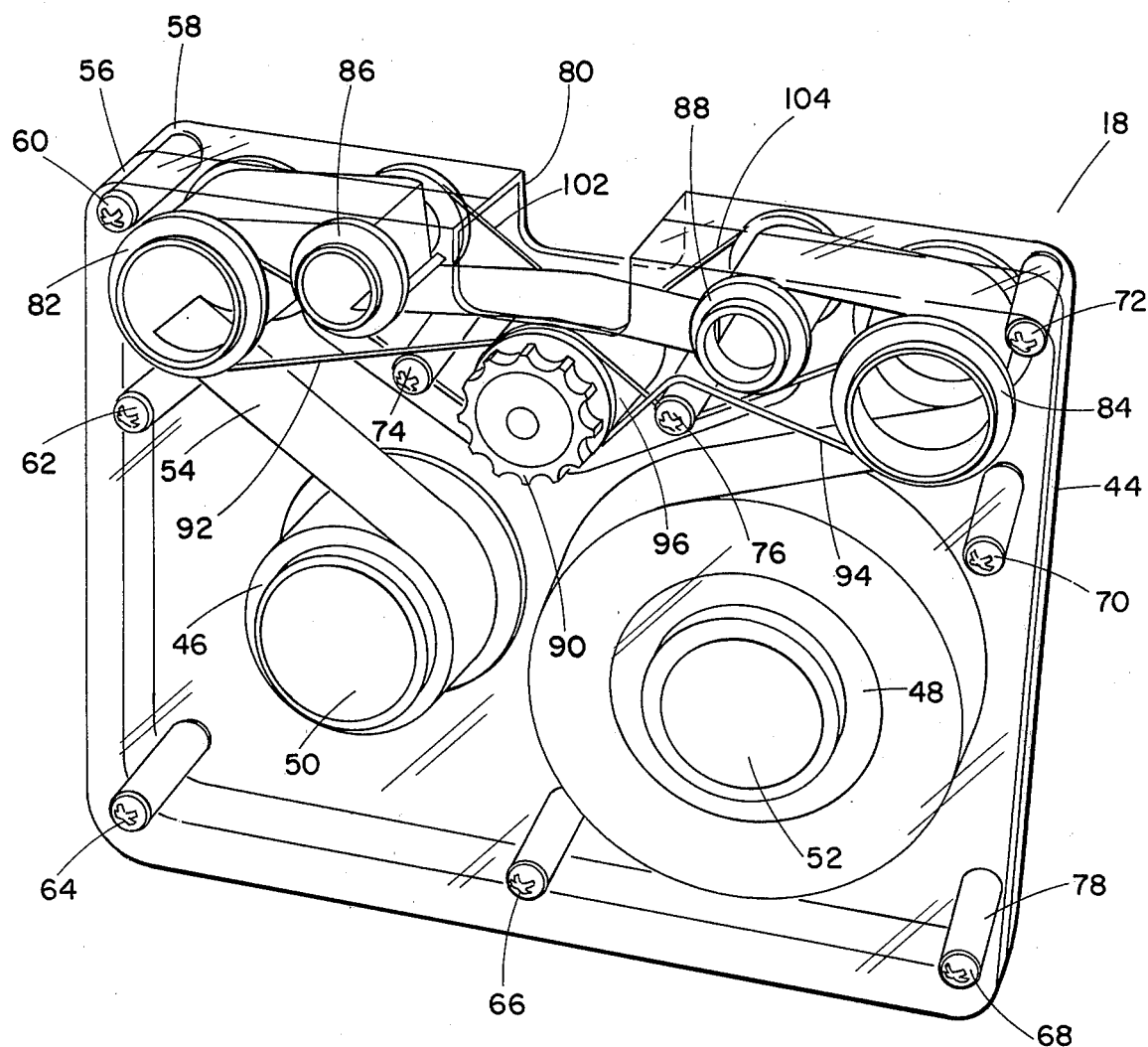
FIG. 2 is a perspective view of a magnetic tape cassette.

In FIG. 2 the cassette 18 is illustrated in a perspective view with the housing of the cassette 44 shown as being composed of clear plastic so that the various elements of the cassette can be clearly identified. Within the housing are mounted two tape reels 46 and 48 which are rotatably secured to the housing 44 by means of hubs 50 and 52. Wound on the tape reels 46 and 48 is a web medium 54 which in this embodiment of the invention is preferably one inch wide magnetic tape. The tape reels 46 and 48 are adapted to be driven by the reel drives 30 and 32.

The housing itself is composed of two halves 56 and 58 joined together by means of the fastening devices 60, 62, 64, 66, 68, 70, 72, 74 and 76. The fastening devices 60 through 76 are preferably, as shown in FIG. 2, screws which extend through the housing 44, within plastic sleeves as identified for example by reference numeral 78 on fastening device 68. The cassette housing 44 also is configured with a generally rectangular shaped aperture 80 suitable for receiving the magnetic head 28 when the cassette 18 is loaded in the tape deck 10.

In order to facilitate loading of the cassette 18 into the tape deck 10, the cassette 18 also includes a pair of annular rotatable capstan actuators 82 and 84, as well as, a pair of annular rotatable tape guide actuators 86 and 88 controlled by knob mechanism 90. As shown in FIG. 2, the rotatable capstan actuators 82 and 84 are controlled by wires or cables indicated by reference numeral 92 to the left of knob 90 and by reference numeral 94 to the right of knob 90 with the control wires 92 and 94 being wound around a reel 96 on the knob mechanism 90 and around the capstan actuators 82 and 94 such that rotation of the knob 90 will cause the capstan actuators 82 and 84 to rotate.

Similarly included in the cassette 18 are the annular rotatable tape guide actuators 86 and 88. As shown in FIG. 2, the tape 54 is threaded through the tape guide actuators 86 and 88 which are shown in a loading position such that they tend to push the tape into the aperture 80 of the cassette housing thereby facilitating the loading of the cassette 18 into the tape deck 10 without damage to the tape 54 from the magnetic head 28. As with the capstan actuators 82 and 84, the rotatable tape guide actuators 86 and 88 are controlled by the knob mechanism 90 by means of a pair of control wires 102 and 104. As will be explained in connection with FIGS. 3 and 4, rotation of the knob 90 will cause the capstan actuators 82 and 84 to rotate in opposite directions while simultaneously the tape guide actuators 86 and 88 will rotate in opposite directions to facilitate the loading and unloading of the cassette 18 into the tape deck 10.

Figure 3:
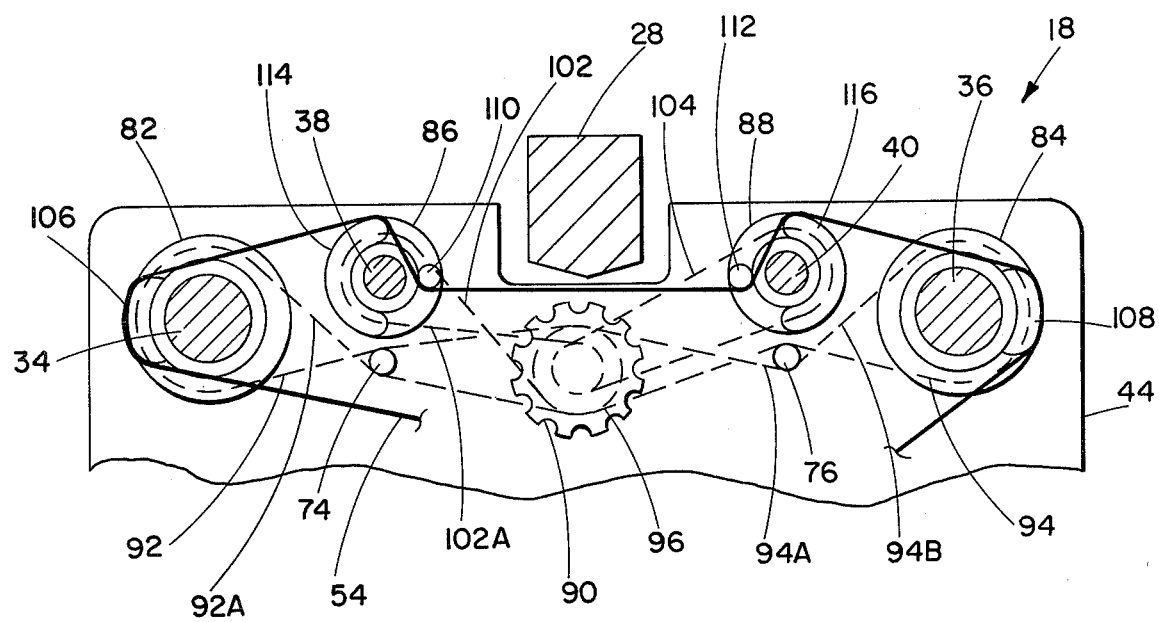
FIG. 3 is a partial sectioned plan view of the magnetic tape cassette in a load position.

FIG. 3 is a partial sectioned view of the cassette 18 with portions of the tape deck 10 included as though the cassette were loaded in the tape deck so that the operation of the cassette can be clearly illustrated. In FIG. 3, the tape deck capstans 34 and 36, the guide pins 38 and 40 and the magnetic head 28 have been shaded to indicate that they belong to the tape deck 10. In FIG. 3, the cassette is shown in a load mode or position in which position the cassette is ready to be removed or inserted into the tape deck 10. The capstan actuators 82 and 84 have been rotated by means of control wires 92 and 94 into a position where portions 106 and 108 of capstan actuators 82 and 84 respectively effectively pull the magnetic tape 54 away from the capstans 34 and 36. Also as indicated in FIG. 3, both the capstan actuators 82 and 84 and the tape guide actuators 98 and 100 are spaced apart from and are coaxial with respectively said capstans 34 and 36 and said guide pins 38 and 40.

At the same time the tape guide actuators 86 and 88 have been effectively rotated by control wires 102 and 104 such that the tape 54 has been pulled away from the magnetic head 28. First guide members 110 and 112 of tape guide actuators 86 and 88 respectively serve to force the tape 54 away from the magnetic head 28. A second pair of tape guide members 114 and 116 located on tape guide actuators 86 and 88 respectively serve to move the tape 54 away from the tape deck guide pins 38 and 40.

As is illustrated in FIG. 3 of the drawings when the knob 90 has been rotated into a load position, the cassette 18 can be loaded or unloaded from the deck 10 without the capstans 34 and 36, the guide pins 38 and 40 or the magnetic head interfering with the tape 54.

Figure 4:
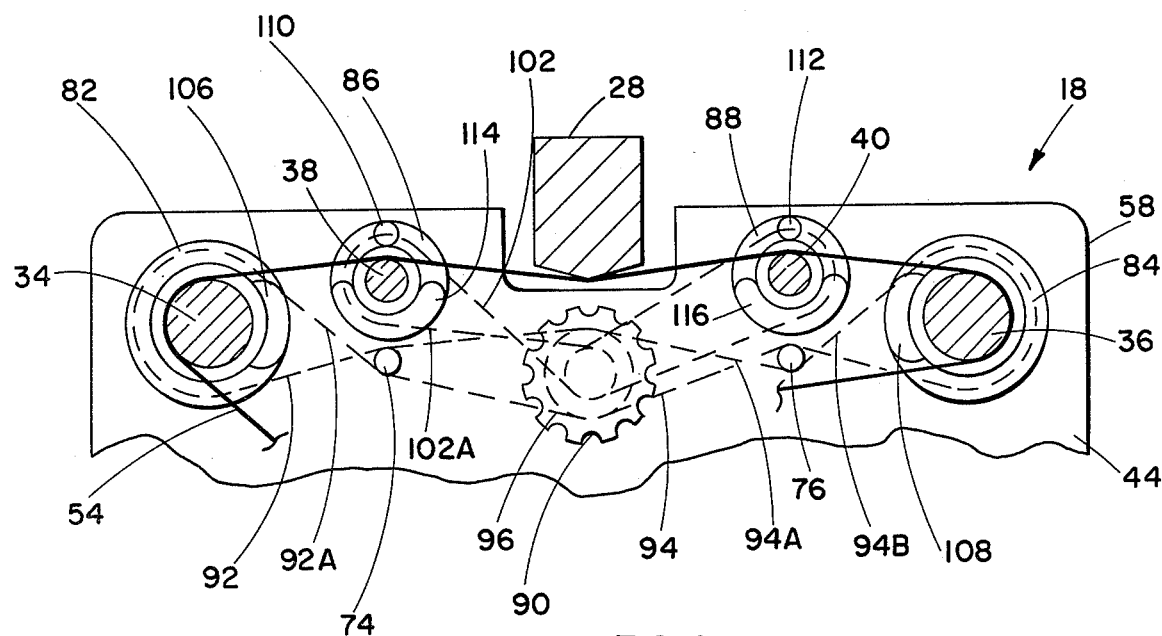
FIG. 4 is a partial sectioned view of the cassette in a play position.

The cassette 18 is illustrated in a play mode or position in FIG. 4. The knob 90 has been rotated 180° in a clockwise direction from that shown in FIG. 3. Rotation of knob 180° in this manner will cause the capstan actuators by means of control wires 92 and 94 to rotate 180° so that the members 106 and 108 are no longer in contact with the tape 54 resulting in the tape 54 coming into engagement with the capstans 34 and 36. Since control wire 92 crosses at point 92A to the left of fastening device 74 which also serves as a wire guide, a rotation of the knob 90 180° in a clockwise direction will cause actuator 82 to rotate 180° in a counterclockwise direction. By the same token, since control wire 94 crosses both to the left at point 94A of fastening device 76 and to the right at point 94B of fastening device 76, rotation of knob 90 180° in a clockwise direction will cause capstan actuator 84 to rotate 180° in a clockwise direction. Pin 76, thus, serves as a wire guide for control wire 94.

In a similar manner, rotation of the knob 90 180° in a clockwise direction will cause tape guide actuator 86 to rotate in a counterclockwise direction 90° and the tape guide actuator 88 to rotate in a clockwise direction 90°. As shown in FIG. 4, control wire 102 crosses at point 102A between the knob 90 and the actuator 86 thereby causing actuator 86 to rotate in the opposite direction to knob 90. When the tape guide actuators 86 and 88 are rotated into the position as shown in FIG. 4, the tape 54 will be directed by the tape guide pins 38 and 40 across the magnetic head 28 when the cassette 18 is loaded into the tape deck 10.

Another feature of the disclosed cassette is that the reels 46 and 48 as shown in FIG. 2 are located within the cassette such that the tape 54 will make a minimum of a 165° wrap around the capstans 34 and 36 thereby providing adequate tape and capstan surface contact to drive the tape over the magnetic head 28. It is this large angle of wrap that allows the cassette and tape deck to drive the magnetic tape across the tape head 28 without the requirement for pinch rollers.

Figure 5:
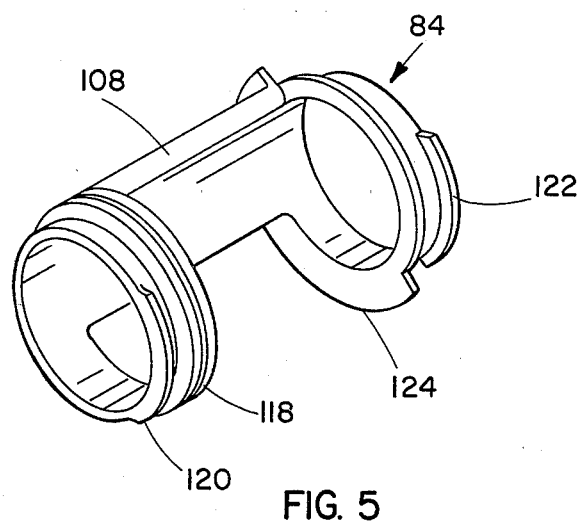
FIG. 5 is a perspective view of a capstan actuator.

A perspective view of one of the capstan actuators 84 is provided in FIG. 5. The capstan actuator 84 is generally cylindrical with the portion 108 forming a section of a cylinder and serves to engage the tape 54 when the actuator is rotated into a load position. Groove 118 receives the control wire 94 and flanges 120 and 122 serve to retain the actuator 84 in the housing 44. The actuator 84 is also provided with a flange 124 which performs an interlock function as described hereinafter.

Figure 6:
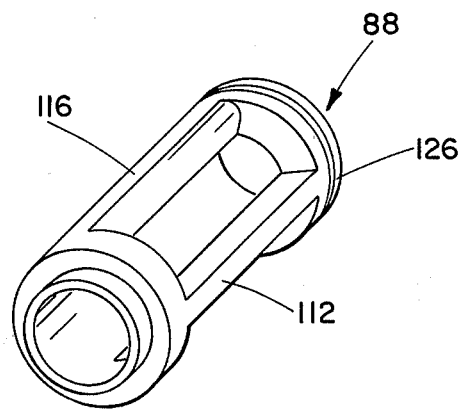
FIG. 6 is a perspective view of a tape guide actuator.

An example of one of the rotatable tape guide actuators 88 is shown in FIG. 6. As with the capstan actuator 84, the tape guide actuator is configured generally in the shape of a cylinder with the first guide member 112 and the second guide member forming a portion of the body of the cylinder. A groove 126 receives the control wire 104.

Figure 7:
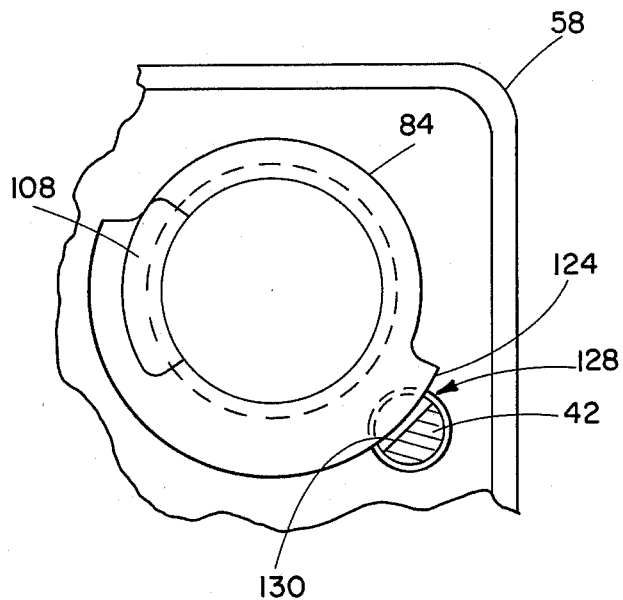
FIG. 7 is a partial sectioned view of a capstan actuator and an interlock pin.
Figure 8:
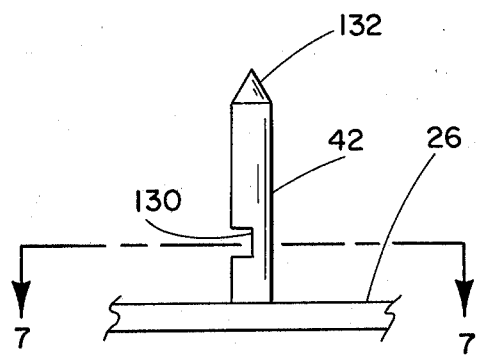
FIG. 8 is a side view of an interlock pin.

FIG. 7 illustrates the operation of the interlock pin 42 of FIG. 1. The rear half 58 of the cassette housing 44 includes a circular aperture indicated at 128 of FIG. 7. The interlock pin 42, shown in sectioned form in FIG. 7 fits through the aperture 128 when the cassette 18 is loaded in the tape deck 10. When the capstan actuator 84 is rotated into the play position as shown in FIG. 7 the flange 124 will engage a groove 130 in the interlock pin 42. A side view of the interlock pin is shown in FIG. 8. The interlock pin will thus prevent the loading or unloading of the cassette 18 into the tape deck 10 when the cassette 18 and hence the capstan actuator 84 is in a play position. The interlock pin is tapered 132 to allow ease of insertion of the cassette 18 into the tape deck 10.

I claim:

1. A tape cassette for use with a dual capstan tape deck having a magnetic head comprising:
   a housing including an aperture configured to receive the magnetic head when the cassette is loaded in the tape deck;
   a pair of tape reels including tape secured within said housing;
   a pair of capstan actuators secured within said housing effective to move the tape from the tape deck capstans when the cassette is loaded in the deck; and
   a pair of rotatable tape guide actuators secured within said housing effective to move the tape away from the magnetic head to permit loading the cassette in the deck.

2. The cassette of claim 1 wherein said rotatable tape guide actuators are located within said housing between said capstan actuators and said housing apertures.

3. The cassette of claim 1 wherein each of said rotatable tape guide actuators includes a guide member such that in a load position said guide members serve to move the tape in said housing aperture away from the magnetic head.

4. The cassette of claim 3 additionally including means to simultaneously rotate both tape guide actuators from said load position to a play position.

5. The cassette of claim 4 wherein said rotating means includes a manually rotatable knob and at least one wire connected to each of said rotatable tape guide actuators and said knob such that rotation of the knob will cause rotation of the tape guide actuators.

6. The cassette of claim 5 wherein rotation of said knob from said play position to said load position will cause one of said tape guide actuators to rotate clockwise into said load position and the other counterclockwise into said load position.

7. The cassette of claim 6 wherein the wire connecting one of said rotatable tape guide actuators crosses between the tape guide actuator and said knob.

8. The cassette of claim 1 wherein said capstan actuators are generally cylindrical in configuration with more than half of the cylinder portion open to permit the tape to engage the capstans in a play position and the remaining portion of the cylinder effective to engage the tape in a load position.

9. The cassette of claim 5 wherein said capstan actuators are generally cylindrical in configuration with more than half of the cylinder portion open to permit the tape to engage the capstans in a play position and the remaining portion of the cylinder effective to engage the tape in a load position.

10. The cassette of claim 9 wherein said rotating means includes at least one wire connected to each of said capstan actuators and said knob such that rotation of the knob will cause rotation of the capstan actuators.

11. The cassette of claim 10 wherein rotation of said knob from the play position to the load position will cause one of said capstan actuators to rotate in a clockwise direction to the load position and the other in a counterclockwise direction to the load position.

12. The cassette of claim 1 wherein said cassette housing includes an aperture effective to receive a member from the tape deck and one of said capstan actuators includes an interlock member that at least in part will cover said aperture in a play position.

13. The cassette of claim 1, 2, 3, 4, 5, 6, 7, 8, 9, 10, 11 or 12 wherein said tape reels are located in said cassette housing such that the angle of the tape wrap over the capstans is at least 165 degrees.

14. The cassette of claim 11 wherein said wire connected to said capstan actuators crosses between said knob and one of said capstan actuators resulting in the rotation of this capstan actuator in an opposite direction from said knob and wherein said cassette housing includes a capstan actuator wire guide secured to said housing with said wire connected to the other of said capstan actuators crossing between said knob and said actuator wire guide and said other capstan actuator resulting in the rotation of this capstan actuator in the same direction as said knob.

15. The cassette of claim 11 wherein said wires connecting said rotatable tape guides and said capstan actuator to said knob such that rotation of said knob causes said capstan actuators to rotate the same angular distance as said tape guide actuators.

16. The cassette of claim 15 wherein a rotation of said knob of 180° causes said capstan actuator to rotate 180° and said tape guide actuators to rotate 90°.

17. A magnetic tape system comprising:
    a tape deck including two capstans, a magnetic head, two tape guide pins and two reel drive mechanisms; and
    a tape cassette including;
    a housing including an aperture configured to receive said magnetic head when the cassette is loaded in said tape deck;
    a pair of tape reels including tape rotatably secured within said housing and adapted to be driven by said reel drive mechanisms;
    a pair of annular capstan actuators rotatably secured within said cassette housing and located so as to be coaxial with said capstans when the cassette is loaded in said tape deck;
    a pair of annular tape guide actuators rotatably secured within said cassette housing and located to be coaxial with said tape guide pins when the cassette is loaded in said tape deck; and
    means for simultaneously rotating both of said annular capstan actuators and both of said annular tape guide actuators.

18. The system of claim 17 wherein each of said annular guide actuators include a first guide member and a second guide member such that when said annular tape guide actuators are rotated into a load position said first guide member moves the tape in said cassette housing aperture away from said magnetic head and said second guide member moves the tape away from said tape guide pins and such that when said annular guide members are rotated into a load position the tape passes between said first and second guide members and is disposed to said tape guide pins effective to guide the tape over the magnetic head when said cassette is loaded in said tape deck.

19. The cassette of claim 18 wherein said capstan actuators are generally cylindrical in configuration with more than half of the cylinder portion open to permit the tape to engage the capstans in a play position and the remaining portion of the cylinder effective to engage the tape in a load position.

20. The cassette of claim 19 wherein said rotating means includes a manually rotatable knob and at least one wire connected to each of said rotatable tape guide actuators and said knob such that rotation of the knob will cause rotation of the tape guide actuators.

21. The cassette of claim 20 wherein said rotating means includes at least one wire connected to each of said capstan actuators and said knob such that rotation of the knob will cause rotation of the capstan actuators.

22. The cassette of claim 21 wherein rotation of said knob from the play position to the load position will cause one of said capstan actuators to rotate in a clockwise direction to the load position and the other in a counterclockwise direction to the load position.

23. The cassette of claim 22 wherein a rotation of said knob of 180° causes said capstan actuator to rotate 180° and said tape guide actuators to rotate 90°.

24. The cassette of claim 23 wherein said wire connected to said capstan actuators crosses between said knob and one of said capstan actuators resulting in the rotation of this capstan actuator in an opposite direction from said knob and wherein said cassette housing includes a capstan actuator wire guide secured to said housing with said wire connected to the other of said capstan actuators crossing between said knob and said actuator wire guide and said other capstan actuator resulting in the rotation of this capstan actuator in the same direction as said knob.

25. The cassette of claim 24 wherein the wire connecting one of said tape guide actuators crosses between the tape guide actuator and said knob.

26. The cassette of claim 17, 18, 19, 20, 21, 22, 23, 24 or 25 wherein said tape reels are located in said cassette housing such that the angle of the tape wrap over the capstans is at least 165 degrees.

* * * * *